(12) United States Patent
Young

(10) Patent No.: US 7,095,187 B2
(45) Date of Patent: Aug. 22, 2006

(54) LED STROBE LIGHT

(75) Inventor: Garrett J. Young, Farmingdale, NJ (US)

(73) Assignee: Dialight Corporation, Farmingdale, NJ (US)

( * ) Notice: Subject to any disclaimer, the term of this patent is extended or adjusted under 35 U.S.C. 154(b) by 58 days.

(21) Appl. No.: 10/759,026

(22) Filed: Jan. 20, 2004

(65) Prior Publication Data
US 2005/0156531 A1 Jul. 21, 2005

(51) Int. Cl.
H05B 37/02 (2006.01)
(52) U.S. Cl. .................. 315/360; 315/112; 315/294; 315/297; 315/169.3; 362/227; 362/800
(58) Field of Classification Search ............ 315/169.3, 315/169.1, 291, 294, 297, 360, 112; 362/800, 362/362, 227, 434, 347, 241, 231, 297, 346, 362/350
See application file for complete search history.

(56) References Cited

U.S. PATENT DOCUMENTS

| 5,010,412 | A | * | 4/1991 | Garriss ..................... 348/371 |
| 5,038,742 | A | * | 8/1991 | Uddin ....................... 123/549 |
| 5,211,480 | A | * | 5/1993 | Thomas et al. ............. 374/161 |
| 5,698,866 | A | * | 12/1997 | Doiron et al. ................ 257/99 |
| 6,379,026 | B1 | * | 4/2002 | Petrick ....................... 362/347 |
| 6,483,254 | B1 | * | 11/2002 | Vo et al. .................. 315/241 S |
| 2004/0120156 | A1 | * | 6/2004 | Ryan ......................... 362/373 |

* cited by examiner

Primary Examiner—Haissa Philogene
(74) Attorney, Agent, or Firm—Oblon, Spivak, Maier & Neustadt, P.C.

(57) ABSTRACT

An LED light that includes an LED light source. A thermoelectric device is configured to maintain the LED light source within a predetermined temperature range. A controller provides a pulse signal to the LED light source, so that the LED light can particularly operate as a strobe light. Such an LED light can find application in an obstruction light.

18 Claims, 2 Drawing Sheets

LED STROBE LIGHT

BACKGROUND OF THE INVENTION

1. Field of the Invention

The present invention is directed to a strobe light that includes a light emitting diode (LED) light source.

2. Background of the Invention

Gas discharge strobe lights are well known in the art. Such strobe lights find particular application for emergency vehicles, radio towers, photography, and entertainment venues. Such conventional strobe lights utilize incandescent or gas light sources, and most commonly are xenon discharge lamps. Incandescent light or gas sources have relatively high energy consumption and have relative short lifetimes, resulting in relatively high maintenance costs. Gas discharge strobe lamps are also susceptible to breakage, produce intense ultraviolet light that breaks down many materials, and produce ozone due to high voltage requirements. Such conventional gas discharge strobe lights also have reliability problems and have relatively complicated supporting electronics to maintain the flashing operation.

SUMMARY OF THE INVENTION

Accordingly, one object of the present invention is to provide a novel strobe light, with novel driving circuitry, utilizing an LED light source. Such a novel strobe light provides the benefits, in comparison with a conventional gas discharge strobe light, of being lower in energy consumption, having a longer lifetime, having improved reliability, and having simplified supporting electronics.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
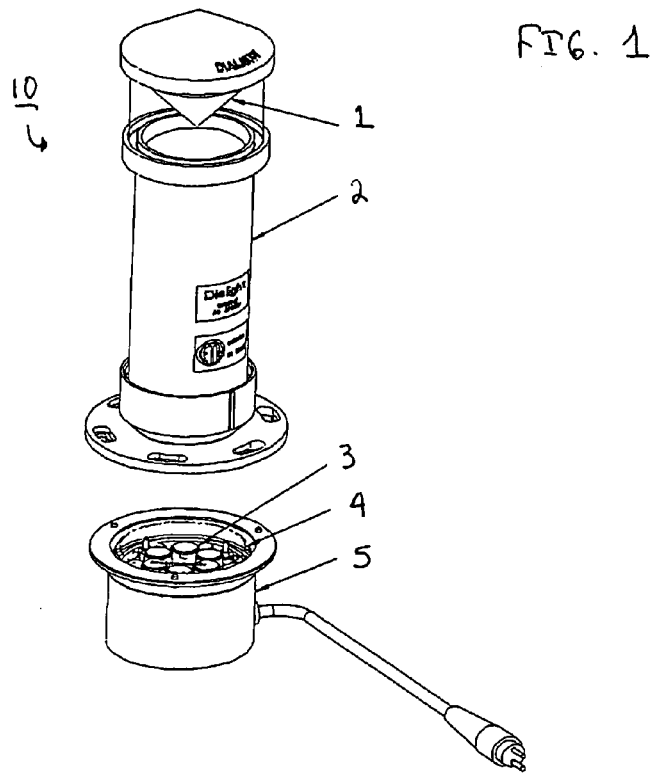
FIG. 1 shows the structure of the LED strobe light of the present invention in an exploded view.

In the drawings, like reference numerals designate identical or corresponding parts throughout the several views.

FIG. 1 shows an LED strobe light 10 of the present invention in an exploded view. As shown in FIG. 1, the LED strobe light 10 includes a main body portion 2 and a top reflector portion 1 to be positioned at a top of the main body portion 2. The top reflector portion 1 includes a conical-type shaped reflector reflecting light out of the main body portion 2.

FIG. 1 shows the LED strobe light 10 in which light is output radially from the top reflector portion 1. The specific embodiment shown in FIG. 1 is only one example of a structure that an LED strobe light can take. It is known in the art to utilize LED lights that output light in a unidirectional direction, and it is also known to use LED obstruction type lights to which the present invention can also be applied, as other examples.

Further, the main body portion 2 is placed on top of a driving control module 5. The driving control module 5 includes control circuitry 4 for driving a plurality of LEDs 3.

Figure 2:
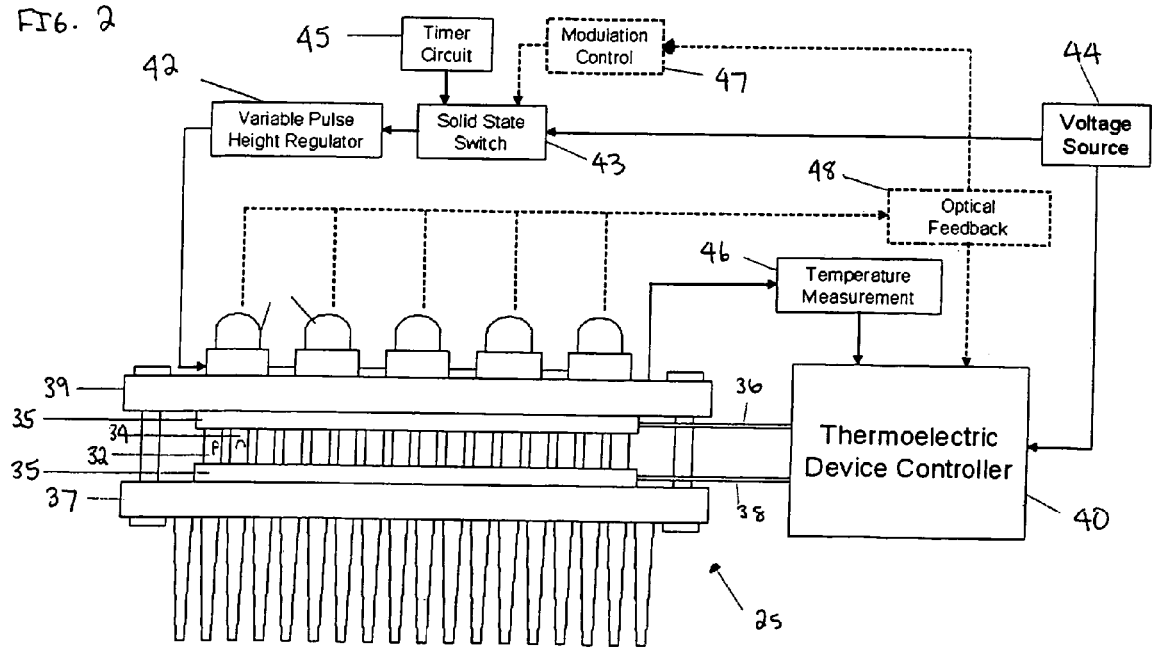
FIG. 2 shows the structure of the driving circuitry of the LED strobe light of the present invention in a block diagram view.

FIG. 2 shows in schematic block diagram the driving circuitry 4 and LEDs 3 provided in the driving module 5.

As shown in FIG. 2 the LEDs 3 are mounted on a thermoelectric module 25. A thermoelectric device controller 40 is provided to control the thermoelectric module 25. A voltage source 44 provides an input to the thermoelectric device controller 40 and also provides a voltage to a solid state switch 43. The solid state switch 43 also receives an input from a timer circuit 45. An output of the solid state switch 43 is provided to a variable pulse height regulator 42, and an output of the variable pulse height regulator is provided to the LEDs 3. The LEDs 3 are driven by an adjustable signal output from the variable pulse height regulator 42.

A temperature measurement sensor 46 is also provided to measure temperature at the LEDs 3. An output of the temperature measurement device 46 is also provided to the thermoelectric device controller 40. As discussed below the temperature measurement device 46 can provide a temperature feedback control.

The solid state switch 44, which for example can be a MOSFET, turns the LEDs 3 on/off in accordance with the signal provided from the voltage source and timer circuit 45. The timer circuit 45 is provided so that the solid state switch 43 only drives the LEDs 3 at the appropriate timing, to effectuate the strobe operation.

The applicant of the present invention recognized that a very precise temperature control of individual LEDs of the LED strobe light provides significantly enhanced results in such a device. Precise temperature control is significantly beneficial because it limits the maximum instantaneous die temperature of the LEDs.

The applicant of the present invention also recognized that particularly in the context of LEDs 3 in an LED strobe light, the lower the temperature the greater the luminance output efficiency and/or the greater the maximum allowable LED current. Theoretically, if the temperature at the LED is maintained, then the only limit on the maximum pulse current results from so-called "crowding effects"; "crowding effects" indicating a condition in which a high density of electrons that have slow movement due to low voltage drift fields cause semiconductor damage.

Thereby, the driving circuitry 4 for the LEDs 3 in the present invention allows reducing the temperature of the LEDs 3, and also allows a precise temperature control at the LEDs 3.

As shown in FIG. 2 the LEDs 3 are mounted on the thermoelectric module 25. The thermoelectric module 25 includes a pair of ceramic substrates 35. Formed between the ceramic substrates 35 are p-type semiconductor pellets 32 and n-semiconductor pellets 34. A positive input 36 and a negative input 38 are also provided to the ceramic substrates 35. A support substrate 39 for the LEDs 3 and a heat sink 37 are also provided.

Such a thermoelectric module 25 is a solid state semiconductor device that functions as a heat pump using the Peltier effect. Such a thermoelectric module 25 and its operation are known in the art. In such a thermoelectric module 25 the power applied is directly proportional to the quantity of the heat pumped, and thereby the thermoelectric module 25 can operate as an effective temperature regulator for an LED contacting either of the ceramic substrates 35, and therefore the LED temperature can be precisely controlled.

In FIG. 2 such a thermoelectric module 25 includes a cold side at which heat is absorbed, the side of one of the ceramic substrates 35, and a hot side at which heat is rejected, the side of the other ceramic substrates 35. In such a structure an LED is mounted on either of the heat absorbing side or heat rejecting side so that the temperature at the LED can be precisely controlled; in the present embodiment the LEDs 3 are mounted on the heat absorbing side to lower the temperature of the LEDs 3 as much as possible. The direction in which the heat is pumped can be controlled by the polarity of the applied voltage from the conductors 36, 38 or the direction of current. The heat absorbing and rejecting sides can be switched by reversing the polarity of the applied signal. One of the ceramic substrates 35 is also thermally connected to the heat sink 37 for dissipating heat, although an alternative heat dissipating structure such as a heat pipe or other appropriate heat dissipating structure could be employed.

Also connected to the thermoelectric module 25 is a temperature measurement device 46. The temperature measurement device 46 measures the temperature at the individual LED elements 3. The temperature measurement device 46 can take the form of any type of heat sensor, such as a thermocouple or an arrangement that monitors LED forward voltage changes to extrapolate a die temperature at the LEDs 3. Further, an output of the temperature measurement device 46 is provided to the thermoelectric device controller 40. The thermoelectric device controller 40 can receive signals indicating the temperatures at the individual LEDs 3 and can thereby control the driving signals provided to the individual LEDs 3 and the thermoelectric module 25. In such a way a temperature feedback can be effectuated.

As also shown in FIG. 2, a modulation control circuit 47 can also be provided to provide an input to the solid state switch 43. That modulation control circuit 47 is also connected to an optical feedback circuit 48 to receive a control signal from the optical feedback circuit 48; both of these elements are optional elements. The optical feedback circuit 48 provides output to both the modulation control circuit 47 and the thermoelectric device controller 40.

Utilizing the additional modulation control circuit 47 and optical feedback 48 circuit allows precise control of the specific color output by the LEDs 3. More particularly, modulating the signal provided to the thermoelectric device control 40 allows a very precise temperature regulation at the LEDs 3. In addition, the modulation can be provided to the LED drive signal output from the variable pulse height regulator 42 to control the pulse characteristics to individual of the LEDs 3. Utilizing such a precise temperature regulation can tune the dominant wavelength or chromaticity of the LEDs 3.

In one specific instance, the LEDs 3 may be illuminated phosphor based white LEDs. However, an illuminated phosphor based white LED 3 has variations in perceived color temperature between different manufactured dyes. Modulation schemes, for example a frequency modulation, pulse width modulation, nested modulation (i.e. double pulse width modulation), etc., implemented by the modulation control 48 can be provided to control the contribution of particular of the LEDs 3, to thereby manipulate the overall color temperature of illumination.

The optical feedback circuit 48, if provided, can sense the color output at the LEDs 3 and thereby provide an optical feedback or calibration factor to the thermoelectric device controller 40 and the modulation control circuit 47 to control the modulation to a defined color point.

As noted above the LED light of the present invention is particularly applicable to an LED strobe light. However, the driving circuitry shown in FIG. 2 may be applicable to other LED lights.

For an LED light to operate in a strobe application, a driving signal provided to the LEDs 3 should have a low duty cycle and a short pulse duration. However, reducing the duty cycle and the current pulse width results in significant increases in the maximum current applied to the LED elements 3. LEDs are devices that heat up when applied with high currents, and that in turn results in a degradation of light output by the LEDs. In turn, that results in making it difficult to accurately control the light output from the LEDs.

To address such potential problems, in the present invention the thermoelectric module 25 and the associated control circuitry in FIG. 2 are provided to reduce increases in the instantaneous temperature at the LEDs 3. Specifically, the thermoelectric module 25 maintains the temperature at the LEDs 3 to be within absolute maximum ratings. That allows further increases in the maximum current without adversely affecting the LEDs 3. Further, that allows the output intensity of the LEDs to scale proportionally, which allows the LEDs 3 to properly operate in a strobe application.

The above-noted description is particularly directed to an operation in an LED strobe light, although as noted above the driving circuitry shown in FIG. 2 is applicable to other types of LED lights.

Figure 3:
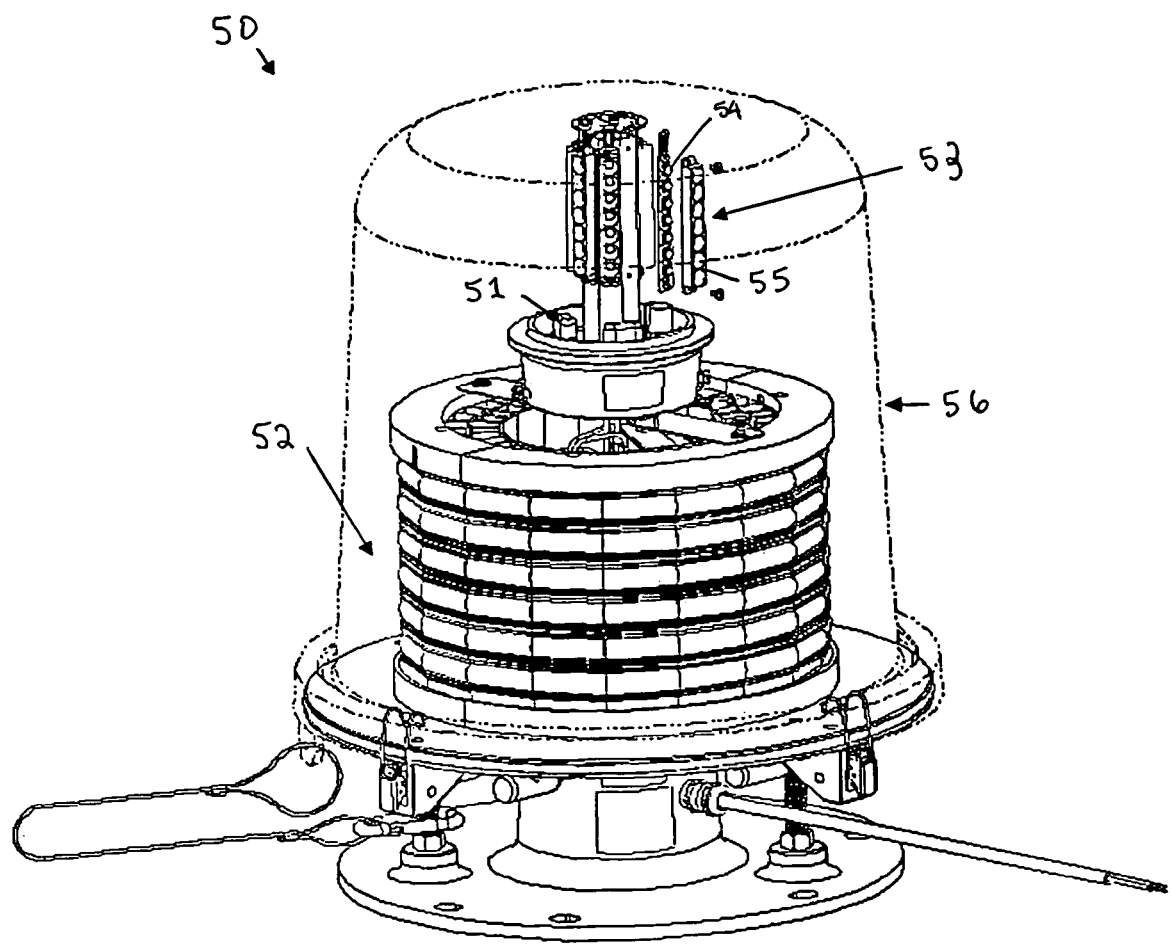
FIG. 3 shows an alternative implementation of the LED strobe light of the present invention in a schematic view.

A specific other implementation of the LED strobe light of the present invention is shown in FIG. 3. FIG. 3 shows an implementation in an obstruction light 50. In the obstruction light 50 of FIG. 3 a first light source 52 is provided. That first light source 52 can be any of a red LED light source, an incandescent light source, or a gas discharge strobe beacon.

The obstruction light 50 in FIG. 3 further includes a white strobe element 53 formed from plural LEDs 54 and that can be covered by an optional collimating reflector 55. Those while strobe LEDs are driven by driving circuitry 51 that corresponds to the driving circuitry shown in FIG. 2. That is, in this embodiment of an obstruction light 50 the white strobe LED lights 54 are mounted on thermoelectric devices as shown in FIG. 2 and include the driving circuitry of FIG. 2.

The overall obstruction light 50 can also be covered by a shield 56 that can include either passive or active optics.

By utilizing an obstruction light 50 as in FIG. 3, the white light output from the white strobes LEDs 54 can be precisely controlled to output the proper white color. Further, those white LEDs 54 can be driven at a high current by virtue of the cooling effect realized by utilizing the thermoelectric device structure and driving circuitry of FIG. 2, so that the white light indications can be very bright and easily observable to a user.

The above-noted structure in FIG. 3 shows a specific application in an obstruction light 50, but of course a structure without the first light source 30 could also be provided, to thereby realize a stand alone LED strobe obstruction light.

Obviously, numerous modifications and variations of the present invention are possible in light of the above teachings. It is therefore to be understood that within the scope of the appended claims, the present invention may be practiced otherwise than as specifically described herein.

The invention claimed is:

1. An LED (light emitting diode) light, comprising:
   (a) an LED light source;
   (b) a thermoelectric device onto which said LED light source is mounted;
   (c) a thermoelectric device controller configured to control said thermoelectric device to maintain said LED light source within a predetermined temperature range; and
   (d) control circuitry configured to provide a pulse signal to said LED light source, wherein said control circuitry comprises:
      (d1) a variable pulse height regulator configured to provide a variable pulse height signal to said LED light source;
      (d2) a solid state switch configured to provide a control of said variable pulse height regulator; and
      (d3) a timer circuit configured to provide a control of said solid state switch.

2. The LED light according to claim 1, further comprising:
   (e) a temperature sensor configured to sense a temperature at at least a portion of said LED light source.

3. The LED light according to claim 1, further comprising:
   (e) a modulation control configured to control the pulse signal provided to said LED light source.

4. The LED light according to claim 2, further comprising:
   (f) a modulation control configured to control the pulse signal provided to said LED light source.

5. The LED light according to claim 1, further comprising:
   (e) an optical feedback controller configured to provide a control signal to said thermoelectric device controller.

6. The LED light according to claim 2, further comprising:
   (f) an optical feedback controller configured to provide a control signal to said thermoelectric device controller.

7. The LED light according to claim 3, further comprising:
   (f) an optical feedback controller configured to provide a control signal to said thermoelectric device controller.

8. The LED light according to claim 4, further comprising:
   (g) an optical feedback controller configured to provide a control signal to said thermoelectric device controller.

9. An obstruction light comprising:
   (a) a first strobe light source for outputting strobe light of a first color;
   (b) an LED (light emitting diode) strobe light for outputting light of a second color, and comprising:
   (b1) an LED light source;
   (b2) a thermoelectric device onto which said LED light source is mounted;
   (b3) a thermoelectric device controller configured to control said thermoelectric device to maintain said LED light source within a predetermined temperature range; and
   (b4) control circuitry configured to provide a pulse signal to said LED light source, wherein said control circuitry (b4) comprises:
      (c1) a variable pulse height regulator configured to provide a variable pulse height signal to said LED light source;
      (c2) a solid state switch configured to provide a control of said variable pulse height regulator; and
      (c3) a timer circuit configured to provide a control of said solid state switch.

10. The obstruction light according to claim 9, wherein said LED strobe light further comprises:
    (b5) a temperature sensor configured to sense a temperature at at least a portion of said LED light source.

11. The obstruction light according to claim 9, wherein said LED strobe light further comprises:
    (b5) a modulation control configured to control the pulse signal provided to said LED light source.

12. The obstruction light according to claim 10, wherein said LED strobe light further comprises:
    (b6) a modulation control configured to control the pulse signal provided to said LED light source.

13. The obstruction light according to claim 9, wherein said LED strobe light further comprises:
    (b5) an optical feedback controller configured to provide a control signal to said thermoelectric device controller.

14. The obstruction light according to claim 10, wherein said LED strobe light further comprises:
    (b6) an optical feedback controller configured to provide a control signal to said thermoelectric device controller.

15. The obstruction light according to claim 11, wherein said LED strobe light further comprises:
    (b6) an optical feedback controller configured to provide a control signal to said thermoelectric device controller.

16. The obstruction light according to claim 12, wherein said LED strobe light further comprises:
    (b7) an optical feedback controller configured to provide a control signal to said thermoelectric device controller.

17. An LED (light emitting diode) light, comprising:
    (a) an LED light source;
    (b) control circuitry configured to provide a pulse signal to said LED light source, wherein said control circuitry comprises:
       (b1) a variable pulse height regulator configured to provide a variable pulse height signal to said LED light source;
       (b2) a solid state switch configured to provide a control of said variable pulse height regulator; and
       (b3) a timer circuit configured to provide a control of said solid state switch.

18. An obstruction light comprising:
    (a) a first strobe light source for outputting strobe light of a first color;
    (b) an LED (light emitting diode) strobe light for outputting light of a second color, and comprising:
    (b1) an LED light source;
    (b2) control circuitry configured to provide a pulse signal to said LED light source, wherein said control circuitry (b2) comprises:
       (c1) a variable pulse height regulator configured to provide a variable pulse height signal to said LED light source;
       (c2) a solid state switch configured to provide a control of said variable pulse height regulator; and
       (c3) a timer circuit configured to provide a control of said solid state switch.

* * * * *